US011412260B2

United States Patent
Alakuijala et al.

(10) Patent No.: US 11,412,260 B2
(45) Date of Patent: Aug. 9, 2022

(54) GEOMETRIC TRANSFORMS FOR IMAGE COMPRESSION

(71) Applicant: Google LLC, Mountain View, CA (US)

(72) Inventors: Jyrki Antero Alakuijala, Wollerau (CH); Jan Wassenberg, Langnau am Albis (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/662,818

(22) Filed: Oct. 24, 2019

(65) Prior Publication Data

US 2020/0137421 A1  Apr. 30, 2020

Related U.S. Application Data

(60) Provisional application No. 62/751,869, filed on Oct. 29, 2018.

(51) Int. Cl.
*H04N 19/46* (2014.01)
*G06T 3/60* (2006.01)
(Continued)

(52) U.S. Cl.
CPC ........... *H04N 19/625* (2014.11); *H04N 19/13* (2014.11); *H04N 19/176* (2014.11); *H04N 19/186* (2014.11)

(58) Field of Classification Search
CPC .. H04N 19/625; H04N 19/176; H04N 19/186; H04N 19/13; H04N 19/12;
(Continued)

(56) References Cited

U.S. PATENT DOCUMENTS 5,164,828 A * 11/1992 Tahara ................. H04N 19/126
  375/E7.145
5,581,665 A * 12/1996 Sugiura ................. B25J 9/1607
  382/296
(Continued)

FOREIGN PATENT DOCUMENTS

CN  102231788 A  11/2011
CN  104704826 A   6/2015
(Continued)

OTHER PUBLICATIONS

Information Technology—Digital Compression and Coding of Continuous-Tone Still Images—Requirements and Guidelines (Year: 1992).*
(Continued)

*Primary Examiner* — Philip P. Dang
(74) *Attorney, Agent, or Firm* — Brake Hughes Bellermann LLP

(57) ABSTRACT

A decoder may perform a method of decompressing images that include texture features that are not aligned with an axis of the image being compressed. In some example implementation, the method may include receiving a block of geometrically transformed pixel values and performing an inverse geometric transformation on the block of geometrically transformed pixel values to generate a first block of pixel values. The geometrically transformed pixel values represent texture features of an image that are non-parallel with a vertical axis or a horizontal axis of the image and the first block of pixel values being one of a plurality of blocks of the image. The example method may further include generating at least a portion of the image based on the first block of pixel values.

16 Claims, 11 Drawing Sheets

(51) Int. Cl.
  *H04N 19/12*     (2014.01)
  *H04N 19/625*    (2014.01)
  *H04N 19/176*    (2014.01)
  *H04N 19/186*    (2014.01)
  *H04N 19/13*     (2014.01)

(58) Field of Classification Search
  CPC ...... H04N 19/85; H04N 19/132; H04N 19/14; H04N 19/46; G06T 3/60; G06T 9/00
  See application file for complete search history.

(56) References Cited

U.S. PATENT DOCUMENTS

| | | | |
|---|---|---|---|
| 5,784,175 A * | 7/1998 | Lee | H04N 19/63 358/3.29 |
| 5,799,113 A * | 8/1998 | Lee | G06T 9/007 382/256 |
| 5,946,419 A * | 8/1999 | Chen | H04N 19/61 375/E7.11 |
| 5,970,173 A * | 10/1999 | Lee | H04N 19/537 375/E7.081 |
| 5,982,438 A * | 11/1999 | Lin | H04N 19/61 375/E7.11 |
| 5,995,670 A * | 11/1999 | Zabinsky | H04N 19/00 375/E7.11 |
| 6,026,182 A * | 2/2000 | Lee | H04N 19/63 382/199 |
| 6,037,988 A * | 3/2000 | Gu | H04N 19/543 375/E7.111 |
| 6,075,875 A * | 6/2000 | Gu | H04N 19/20 375/E7.065 |
| 6,941,019 B1 * | 9/2005 | Mitchell | H04N 19/40 375/E7.129 |
| 7,113,615 B2 * | 9/2006 | Rhoads | B42D 25/29 399/366 |
| 7,146,053 B1 * | 12/2006 | Rijavec | H04N 19/48 375/E7.199 |
| 7,302,104 B2 * | 11/2007 | Suino | G06T 5/002 382/266 |
| 7,336,720 B2 * | 2/2008 | Martemyanov | H04N 19/107 375/E7.262 |
| 7,460,117 B2 * | 12/2008 | Engel | G06T 15/08 345/623 |
| 7,688,894 B2 * | 3/2010 | Liang | H04N 19/146 375/240.18 |
| 7,720,249 B2 * | 5/2010 | Rhoads | G07D 7/004 348/460 |
| 7,782,954 B2 * | 8/2010 | Liang | H04N 19/159 375/240.18 |
| 7,991,237 B2 * | 8/2011 | Sekiguchi | H04N 19/523 382/164 |
| 7,997,126 B2 * | 8/2011 | Kang | G01B 7/34 73/105 |
| 8,194,936 B2 * | 6/2012 | Abramoff | G06V 10/754 382/117 |
| 8,254,455 B2 * | 8/2012 | Wu | H04N 19/89 375/240.16 |
| 8,305,457 B2 * | 11/2012 | Tsurumi | H04N 5/23238 348/222.1 |
| 8,350,929 B2 * | 1/2013 | Tsurumi | G06T 3/0087 348/222.1 |
| 8,514,942 B2 * | 8/2013 | Goel | H04N 19/126 375/240.21 |
| 8,931,155 B2 * | 1/2015 | Daniels | F16G 3/16 29/243.51 |
| 9,088,798 B2 * | 7/2015 | Kato | H04N 19/51 |
| 9,100,664 B2 * | 8/2015 | Ueda | H04N 19/88 |
| 9,125,800 B2 * | 9/2015 | Baker | A61M 25/1002 |
| 9,401,031 B2 * | 7/2016 | Zheng | H04N 19/136 |
| 9,503,628 B1 | 11/2016 | Alsalamah | F16M 11/08 |
| 9,558,567 B2 * | 1/2017 | Guo | H04N 19/593 |
| 9,648,325 B2 * | 5/2017 | Baeza | H04N 19/46 |
| 9,672,636 B2 * | 6/2017 | Zhang | G06T 7/40 |
| 9,736,454 B2 * | 8/2017 | Hannuksela | H04N 13/161 |
| 9,756,329 B2 * | 9/2017 | Yuan | H04N 19/60 |
| 9,843,817 B2 * | 12/2017 | Suzuki | H04N 19/70 |
| 9,866,847 B2 * | 1/2018 | Zheng | H04N 19/61 |
| 9,866,863 B1 | 1/2018 | Han et al. | |
| 9,900,619 B2 * | 2/2018 | Chen | H04N 19/159 |
| 10,070,125 B2 * | 9/2018 | Hannuksela | H04N 19/42 |
| 10,123,027 B2 * | 11/2018 | Hannuksela | H04N 19/463 |
| 10,166,792 B2 * | 1/2019 | Weingartner | B41J 13/0009 |
| 10,284,852 B2 * | 5/2019 | Possos | H04N 19/182 |
| 10,368,097 B2 * | 7/2019 | Aflaki Beni | H04N 19/597 |
| 10,491,922 B2 * | 11/2019 | Zhao | H04N 19/176 |
| 10,511,847 B2 * | 12/2019 | Hannuksela | H04N 19/44 |
| 10,681,379 B2 * | 6/2020 | Zhao | H04N 19/12 |
| 10,715,804 B2 * | 7/2020 | Chida | H04N 19/117 |
| 2004/0057523 A1 * | 3/2004 | Koto | H04N 19/463 375/E7.257 |
| 2005/0008240 A1 * | 1/2005 | Banerji | H04N 19/895 375/E7.262 |
| 2007/0217513 A1 * | 9/2007 | Lopez | H04N 19/63 375/E7.029 |
| 2009/0058883 A1 * | 3/2009 | Piotrowski | G06T 3/60 345/656 |
| 2009/0123066 A1 * | 5/2009 | Moriya | H04N 19/174 382/166 |
| 2011/0188574 A1 * | 8/2011 | Matsuo | H04N 19/14 375/E7.243 |
| 2012/0008675 A1 | 1/2012 | Karczewicz et al. | |
| 2012/0114039 A1 * | 5/2012 | Wang | H04N 11/02 375/E7.243 |
| 2012/0127003 A1 * | 5/2012 | Shibahara | H04N 19/129 341/87 |
| 2012/0170648 A1 * | 7/2012 | Chen | H04N 19/70 375/240.03 |
| 2012/0320975 A1 * | 12/2012 | Kim | H04N 19/11 375/E7.243 |
| 2014/0056362 A1 * | 2/2014 | Mrak | H04N 19/61 375/240.18 |
| 2014/0098883 A1 * | 4/2014 | Hannuksela | H04N 19/597 375/240.12 |
| 2014/0192866 A1 * | 7/2014 | Cohen | H04N 19/593 375/240.12 |
| 2014/0218473 A1 * | 8/2014 | Hannuksela | H04N 19/30 348/43 |
| 2015/0063446 A1 * | 3/2015 | Sugio | H04N 19/463 375/240.03 |
| 2015/0304665 A1 | 10/2015 | Hannuksela et al. | |
| 2016/0330481 A1 * | 11/2016 | Zhang | H04N 19/96 |
| 2017/0094313 A1 | 3/2017 | Zhao et al. | |
| 2019/0306536 A1 * | 10/2019 | Lim | H04N 19/182 |

FOREIGN PATENT DOCUMENTS

| | | | |
|---|---|---|---|
| CN | 108605127 A | 9/2018 | |
| EP | 2034444 A1 * | 3/2009 | G06T 15/04 |

OTHER PUBLICATIONS

Information technology—Generic coding of moving pictures and associated audio information: Systems—H.222.0 (Year: 2006).*
H.263—Video coding for low bit rate communication (Year: 2005).*
H.264—Advanced video coding for generic audiovisual services (Year: 2014).*
H.265—High efficiency video coding (Year: 2016).*
Guerreiro, et al., "Maximizing Compression Efficiency Through Block Rotation"; Institute for Systems and Robotics, Instituto Superior Tecnico, Av. Rovisco Pais, Lisboa, Portugal, arXiv:1411.4290v1 [cs.MM], Nov. 16, 2014, 4 pages.
International Search Report and Written Opinion for PCT Application No. PCT/US2019/058065, dated Jan. 16, 2020, 16 pages.
Wallace, "The JPEG Still Picture Compression Standard"; 8087 IEEE Transaction on Consumer Electronics IEEE Service Center, vol. 38, No. 1, Feb. 1, 1992, 17 pages.

(56) References Cited

OTHER PUBLICATIONS

First Office Action with English translation for Chinese Application No. 201980021026.5, dated Nov. 25, 2021, 26 pages.

* cited by examiner

520

| 0 | 0 | 0 | 0 | 0 | 0 | 0 | 0 |
|---|---|---|---|---|---|---|---|
| 100 | 50 | 0 | 0 | 0 | 0 | 0 | 0 |
| 0 | 50 | 100 | 50 | 0 | 0 | 0 | 0 |
| 0 | 0 | 0 | 50 | 100 | 50 | 0 | 0 |
| 0 | 0 | 0 | 0 | 0 | 50 | 100 | 50 |
| 0 | 0 | 0 | 0 | 0 | 0 | 0 | 50 |
| 0 | 0 | 0 | 0 | 0 | 0 | 0 | 0 |
| 0 | 0 | 0 | 0 | 0 | 0 | 0 | 0 |

| 100 | 0 | 0 | 0 | 0 | 0 | 0 | 0 |
|---|---|---|---|---|---|---|---|
| 37 | 57 | -3 | 5 | 0 | 1 | 0 | 1 |
| -72 | 53 | 34 | 0 | 7 | 0 | 4 | -3 |
| -31 | -62 | 53 | 13 | 5 | 5 | -4 | -4 |
| 0 | -70 | -33 | 37 | 0 | 3 | -14 | 4 |
| -21 | -1 | -79 | -12 | 16 | -23 | 6 | 3 |
| -11 | 0 | -21 | -68 | -16 | -6 | 16 | 0 |
| 7 | -17 | 16 | -42 | -62 | 35 | -1 | 4 |

FIG. 5B

GEOMETRIC TRANSFORMS FOR IMAGE COMPRESSION

CROSS-REFERENCE TO RELATED APPLICATION

This application claims priority to U.S. Patent Application No. 62/751,869, filed on Oct. 29, 2018, entitled "GEOMETRIC TRANSFORMS FOR IMAGE COMPRESSION", which is incorporated by reference herein in its entirety.

BACKGROUND

Images are compressed for efficient storage, retrieval, and transmission. In general, there are two types of image compression, lossless compression and lossy compression. Lossless compression involves the preservation of the image without the loss of any information and therefore without the loss any details. Lossy compression allows loss of information during compression and therefore less than perfect reproduction of the original image. Lossy compression has higher levels of compression ratios because less information is needed to represent the compressed image.

SUMMARY

An example computer-implemented method of compressing images with non-parallel texture features is described. In one aspect, the method includes receiving, by a decoder, a block of geometrically transformed pixel values and performing, by the decoder, an inverse geometric transformation on the block of geometrically transformed pixel values to generate a first block of pixel values, the geometrically transformed pixel values representing texture features of an image that are non-parallel with a vertical axis or a horizontal axis of the image, and the first block of pixel values being one of a plurality of blocks of the image. The method further includes generating, by the decoder, at least a portion of the image based on the first block of pixel values.

Another aspect is a non-transitory computer-readable storage medium having stored thereon computer executable program code which, when executed on a computer system, causes the computer system to perform image compression. The image compression includes performing an inverse geometric transformation on a block of geometrically transformed pixel values to generate a first block of pixel values, the geometrically transformed pixel values representing texture features of an image that are not co-aligned with a horizontal axis or a vertical axis of the image, and the first block of pixel values being one of a plurality of blocks of the image and performing an inverse color space conversion on the first block of pixel values to convert the first block of pixel values that are in a first color space to a second block of pixel values in a second color space. The computer-readable storage medium further includes code for generating at least a portion of the image based on the second block of pixel values in the second color space.

Another aspect is a decoder comprising an inverse geometric transformation component configured to perform inverse geometric transformation on a block of geometrically transformed pixel values to generate a block of pixel values, the geometrically transformed pixel values representing texture features of an image that are diagonally aligned within the image, and the block of pixel values being one of a plurality of blocks of the image and an inverse color space conversion component configured to perform inverse color space conversion on the block of pixel values to convert the block of pixel values from a first color space to a second color space.

In some aspects, an encoder performs compression of an image with non-aligned texture features. The compression may include performing geometric transformation on a block of pixel values and generating geometrically transformed pixel values and geometric transformation values. The compression further includes performing DCT on the geometrically transformed pixel values to generate DCT coefficients, quantizing and entropy encoding the DCT coefficients to generate a compressed bit stream.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations.

FIGS. 5A and 5B illustrate matrices representing blocks of texture features, according to more example implementations.

Figure 1B:
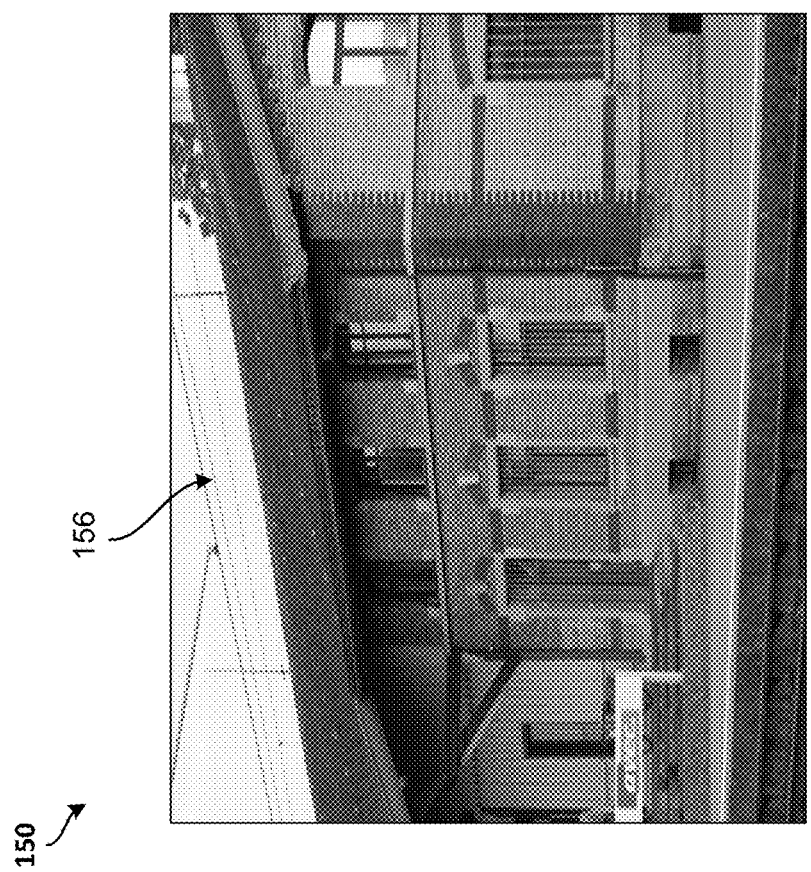
FIGS. 1A and 1B illustrate images with texture features, according to example implementations.

It should be noted that these Figures are intended to illustrate the general characteristics of methods, structure, or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementation. The use of similar or identical reference numbers in the various drawings is intended to indicate the presence of a similar or identical element or feature.

DETAILED DESCRIPTION

During image compression, an image can be divided into pixel blocks (e.g., 8×8 pixel blocks or can be referred to as blocks or as blocks of pixel values). A discrete cosine transform (DCT) is applied to each of the blocks to convert information in the blocks from a spatial domain to a frequency domain. In the spatial domain, the values of pixels in an image change based on a location of a pixel in the image. The frequency domain deals with the frequency at which the values of the pixels in the image change and most of the values of pixels in the frequency domain have zero values resulting in higher compression ratio. The compression may further include quantizing information in the frequency domain to remove unnecessary information and performing entropy encoding to generate a compressed bit stream.

However, the compression mechanism described above may lead to technical problems when compressing images that have texture features that are not aligned (e.g., unaligned, not co-aligned, not parallel, etc.) with an axis (e.g., a horizontal axis, a vertical axis) of the image that is being compressed. Texture features may include natural or man-made objects, for example, a telephone wire, a brick wall, etc. During compression of an image with unaligned texture features, the above-described compression mechanism generates DCT coefficients that are mostly non-zero values resulting in lower compression ratios. In other words, if an image of a house contains a telephone wire that runs across the image such that the telephone wire is not aligned with an axis (e.g., a vertical or x-axis, or a horizontal or y-axis) of the image, the generated DCT coefficients are mostly non-zero values resulting in lower (e.g., inefficient) compression ratios (because non-zero need higher number of bits to represent them).

A proposed solution to this technical problem includes rotating (or geometrically transforming) texture features that are not aligned (e.g., non-parallel, misaligned, diagonally aligned, etc.) with at least an axis of the image to be aligned with at least an axis of the image before performing DCT. This results in generating DCT coefficients (of a block) with mostly zero values. The rotating also generates rotation (or geometrically transformation) values that are used for restoring the texture features to their original positions during decompression. The technical advantages of rotating prior to performing DCT include achieving better compression ratios, faster transmission, and/or higher decoding rates.

The proposed solution, which can be implemented in encoders and/or decoders, is more efficient because the rotating of texture features such that they are aligned with at least one axis of the image generates DCT coefficients that are mostly zeroes which achieves better compression ratios because compression mechanisms rely on reducing or removing redundant information (e.g., zero values) in an image during compression. For instance, in order for the compression mechanism to be effective, patterns (e.g., zeroes) in the data are identified and utilized. The probabilities associated with a likelihood of occurrence of a symbol (e.g., zeroes) are determined and symbols with a high probability of occurring are represented with a smaller number of bits and symbols with a low probability of occurring are represented with a greater number of bits. For example, the rotation of the texture features to be aligned with at least one axis of the image results in DCT values of mostly zeroes, where a value of zero maybe represented with a smaller number of bits resulting in higher compression ratios.

Figure 1A:
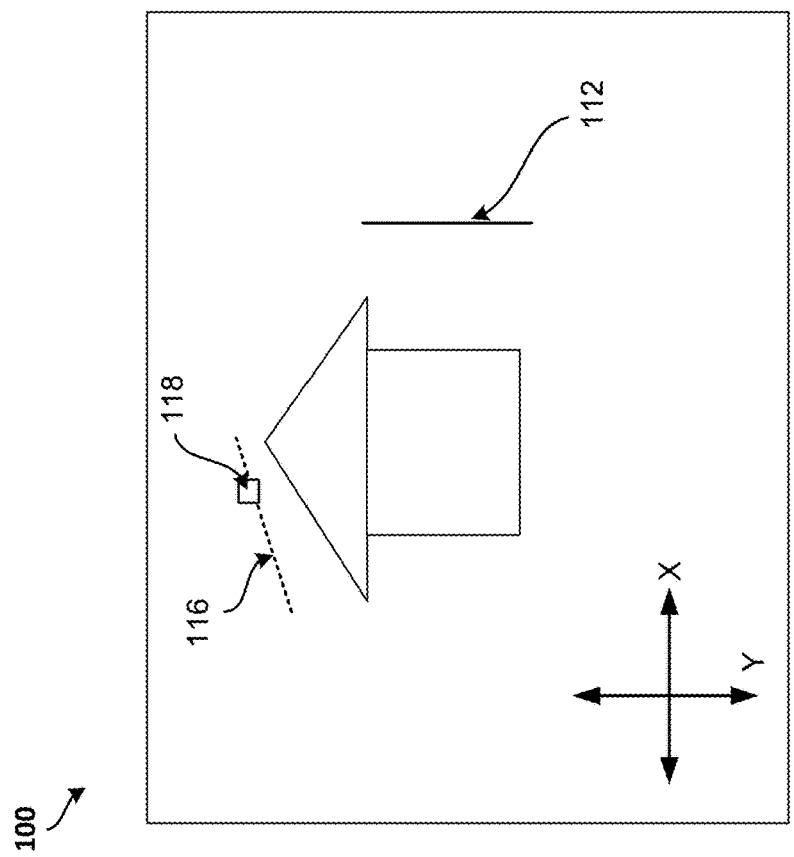

FIG. 1A illustrates an image 100 with various texture features. For example, FIG. 1A includes a model of a house with a texture feature 112, e.g., a fence, which may be aligned with the y-axis (e.g., vertical axis) of the image. The alignment of the texture feature 112 can be compressed with a relatively high compression ratio because most of the DCT coefficients generated during the compression of the texture feature 112 are zero values.

In addition, FIG. 1A illustrates a texture feature 116, e.g., a telephone wire, across the roof of the house. The texture feature 116 is not aligned with either x-axis (e.g., horizontal axis) or y-axis (e.g., vertical axis) of the image. This may result in generating DCT coefficients with mostly non-zero values during the compression of the texture feature 116 of the image 100 resulting in lower (or inefficient) compression ratios during the compression of the image 100. In FIG. 1A, block 118 represents a block of pixels associated with the texture feature 116 that are compressed during the compression of the image 100.

FIG. 1B is an example illustration 150 that shows a telephone wire 156 representing the texture feature 116. As shown in FIG. 1B, the telephone wire is not aligned with either the x-axis or the y-axis of the image, but, is considered to be slanted (e.g., diagonal, oblique, etc.) relative to the horizontal and vertical axes of the image. Since, the telephone wire is not aligned with either x-axis or y-axis of the image, the DCT coefficients are mostly non-zero values result in lower compression ratios.

Figure 2A:
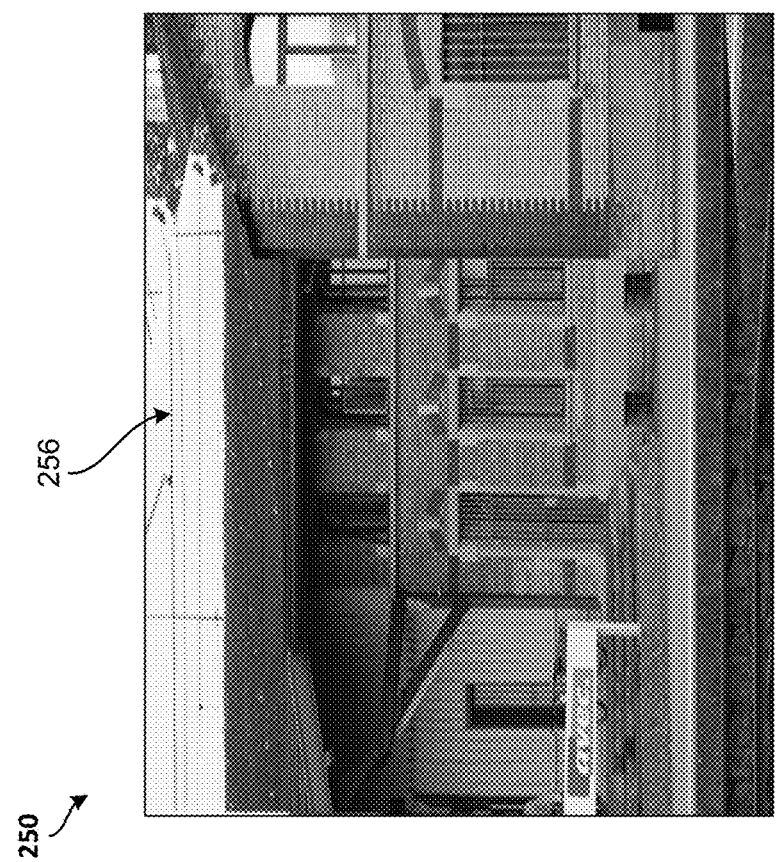
FIGS. 2A and 2B illustrate images with the texture features that are rotated, according to example implementations.

FIG. 2A illustrates an image 200 with the non-aligned texture features shown in FIG. 1A rotated, according to at least one example implementation. As shown in FIG. 2A, the texture feature 116 of FIG. 1A is rotated to a position represented by texture feature 216 such that the texture feature 216 is aligned with an axis of the image (e.g., x-axis in FIG. 2A). This rotation can allow for generation of DCT blocks with mostly zero values which can result in a relatively high compression ratio. The rotation may be also referred to as geometric transformation, geometric conversion, etc.

Figure 2B:
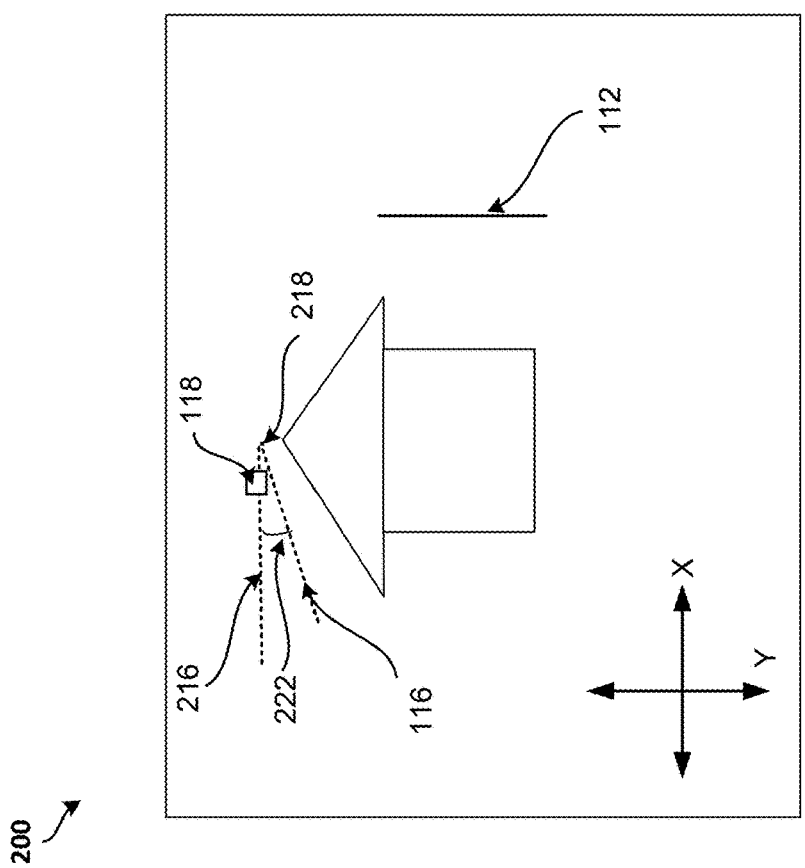

FIG. 2B is an example representation 250 that shows a telephone wire 256 representing texture feature 216. As shown in FIG. 2B, the telephone wire 256 is rotated (or geometrically transformed) by angle of rotation 222 such that the texture feature is aligned with an axis of the image. The rotation (or geometric transformation) may involve rotating a texture feature about a fixed point to generate a rotated (or geometrically transformed) texture feature that is parallel to an axis of the image. In some implementations, for example, the rotation/geometric rotation may involve rotating the texture feature 116 about a fixed point (e.g., 218) to generate the texture feature 216 such that the texture feature 216 is parallel to an axis (e.g., x-axis) of the image.

Figure 6:
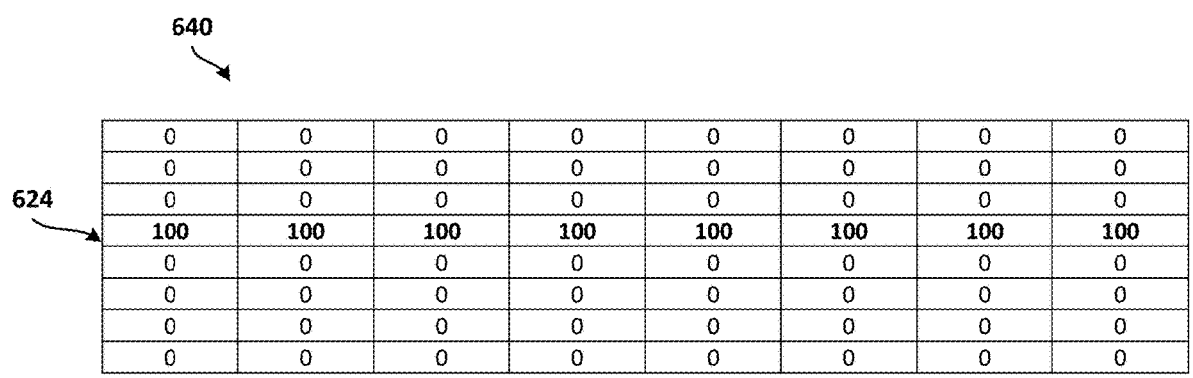
FIG. 6 illustrates a matrix of a rotated texture feature, according to at least one example implementation.

The rotation described above generates DCT blocks with mostly zero values which results in higher compression ratios. An example of such a DCT block that can be compressed with a high compression ratio is shown in at least, for example, FIG. 6. The rotation (or geometric transformation) values for a row (or a column), e.g., row 624 of FIG. 6, are stored during the compression as the row 624 is generated upon rotating of row 524 about x-axis.

Referring back to FIG. 2B, in some implementations, the rotation generates rotation values based on the angle of rotation 222. The angle of rotation 222, for example, may be determined such that the rotation is reduced or maintained at a minimum for the aligning the texture features with an axis of the image. For example, the rotation may be performed such that the texture feature 116 is aligned with the x-axis if the angle of rotation 222 is smaller than the angle of rotation for aligning the texture feature with the y-axis. This can result in managing the number of bits used to represent the rotation values (e.g., keeping the number of bits low). In some implementations, for example, the rotation may be performed such that the texture feature 116 is aligned with the y-axis if the angle of rotation about that y-axis is smaller than the angle of rotation for aligning the texture feature with the x-axis. This can result in managing (e.g., keeping the number of bits low) the number of bits used to represent the rotation values. In addition, in some implementations, for example, the rotation may be performed such that the texture feature 116 is aligned with another axis (e.g., z-axis or some other axis) if the angle of rotation for that axis is smaller.

In some implementations, the geometric transformation is performed on the pixels blocks of the image (e.g., block 118). The geometric transformation is performed on the blocks associated with texture features that are not aligned with an axis of the image (e.g., texture features 116). For example, texture feature 116, after rotation or transformation, is illustrated by texture feature 216 with the angle of rotation shown by 222. The geometric transformation generates geometric transformation values used by a decoder during the inverse geometric transformation for decompressing the image.

In some implementations, for example, a set of 8-bits may be used to represent the rotation (or geometric transformation) values. This is just an example because any number of bits may be used to represent the rotation (or geometric transformation) values. The rotation (or geometric transformation) value may be stored and/or compressed with the rotated blocks and shared with the decoder. The rotation may be based on any type of geometric transform (e.g., affine transform, etc.) and the values that represent the rotation are stored and compressed during the encoding process as they are used during the decoding process. The geometric transformation is just one example and any type of transform (e.g., affine transform, etc.) may be used for rotating the texture features.

Figure 3A:
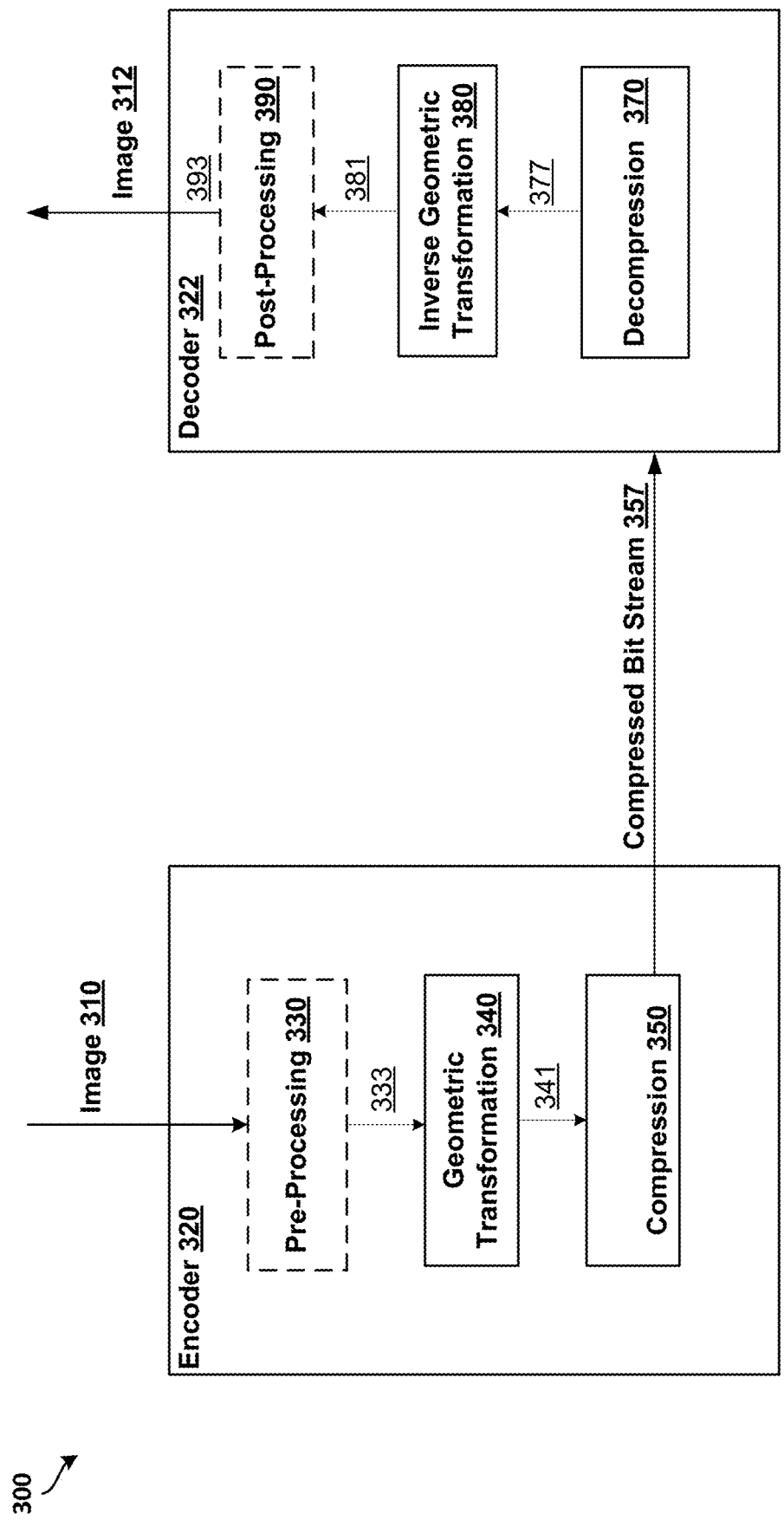
FIGS. 3A and 3B illustrates block diagrams of image processing systems, according to example implementations.

FIG. 3A illustrates a block diagram of an image processing system 300, according to at least one example implementation. In some implementations, for example, an encoder 320 may perform pre-processing 330 and geometric transformation 340 of image 310 prior to performing compression 350 to compress the image 310 to generate a compressed bit stream 357. FIG. 3A further illustrates performing inverse geometric transformation 380 and post-processing 390 after decompression 370 to decompress the compressed bit stream 357 to generate image 312. The image 312 is generated with minimal loss (or no loss) in quality that is visible to a human eye.

FIG. 3A illustrates generalized compression and decompression mechanisms that can be applied to a variety of compression and decompression algorithms (or formats), for example, JPEG, WebP, Pik, etc. In some implementations, for example, the encoding/decoding mechanisms described below may be implemented for video as well. A more specific example of compression and decompression mechanisms are described below in detail in reference to FIG. 3B.

Figure 3B:
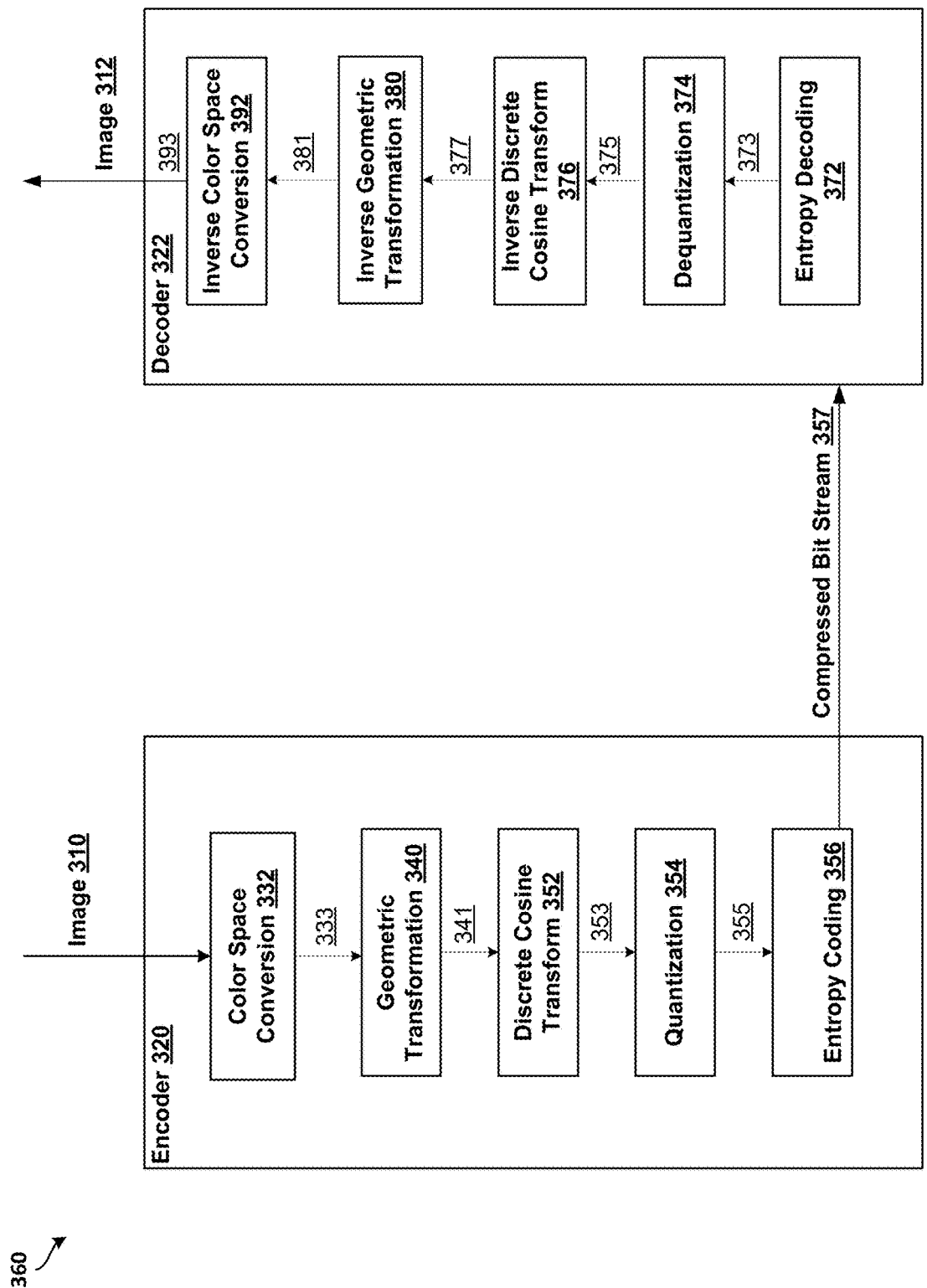

FIG. 3B illustrates a block diagram of an image processing system 360, according to at least one example implementation. In some implementations, FIG. 3B illustrates compression of the image 310 by the encoder 320 to generate the compressed bit stream 357. FIG. 3B further illustrates decompression of the compressed bit stream 357 by a decoder 322 to generate the image 312, with minimal or no loss in quality.

As shown in FIG. 3B, the image 310 is compressed (or encoded) by an encoder 320. The compression mechanism includes the pre-processing 330 which may include color space conversion 322, geometric transformation 324, and the compression 350 (which may include one or more of discrete cosine transform (DCT) 352, quantization 354, and entropy encoding 356). The compression mechanism receives the input image 310 and generates a compressed bit stream 357 as output.

In some implementations, for example, the encoder 320 performs color space conversion 332 to convert the image 310 from one color space (e.g., RGB color space) to another color space (e.g., $YC_bC_r$ color space) because compression in $YC_bC_r$ color achieves higher compression ratios. The conversion from RGB color space to $YC_bC_r$ color space includes converting RGB values of pixels in the image 310 to luminance (e.g., Y) and chrominance (e.g., $C_b$ and $C_r$) values. A luminance value indicates brightness of a pixel and chrominance values indicate blue and red values. The conversion to $YC_bC_r$ color space is just one example and any other color space conversion with compression ratios similar to $YC_bC_r$ may be used. In some implementations, for example, either before or after the color space conversion 332, the encoder 320 may convert the pixels in the image 310 into blocks 333 (e.g., 8×8 block) as part of the compression mechanism. The blocks may be of any size (e.g., 8×8 blocks in some example implementation).

The encoder 320 performs geometric transformation 324 on the blocks 333 (e.g., on the pixels of the blocks). In some implementations, for example, the geometric transformation 324 may be performed on the blocks (e.g., block 118) associated with texture features (e.g., texture features 116) that are not co-aligned with either axes of the image (e.g., image 200). The encoder 320 may determine a rotation (or transformation) that allows the texture features 116 to be co-aligned with either axes of the image, as illustrated in FIGS. 2A and 2B. For example, texture features 116 after rotation are illustrated by texture features 216 with the angle of rotation 222. The performing of the geometric transformation 340 generates rotation values that are used by the decoder 322 during the inverse geometric transformation 380. In some implementations, the geometric transformation values may be stored, quantized, and/or entropy encoded as part of 357.

The rotation may be performed to allow the texture features that are not co-aligned (e.g., are non-parallel) with at least one axis of the image to be co-aligned (e.g., are parallel) with at least one axis of the image to make the representation of the texture features less expensive (e.g., using a lower number of bits). The rotation may be based on any type of geometric transformation (e.g., affine transform, etc.) and the values that represent the rotation are stored and compressed during the encoding process as they are used during the decoding process, for example, during inverse geometric transformation 380.

For example, in some implementations, geometric transformation may include rotating an object (e.g., texture feature (e.g., texture feature 116) by a center of rotation (e.g., 218) and by an angle of rotation (e.g. 222) such that the non-parallel texture feature 116 is parallel to a x-axis or y-axis of the image. In some implementation, inverse geometric transformation may include restoring the geometrically transformed pixel values to their pre-rotation values so that the decompressed image can accurately depict the decompressed texture features.

In some implementations, the rotation values are stored on a tile basis. The tile may be of any size, and in some implementations, the size of the tile is 64×64 pixels (vs the size of a block which may be 8×8 pixels in some implementations). In addition, the four corners of a tile may be used to identify the location of the tile in the image during the decoding process such that they are mapped accordingly. Although the pixels in the image are compressed on a block basis (e.g., 8×8 pixels), the rotation values are stored on a tile basis (e.g., 64×64 pixels) to reduce the number of bits needed to store the rotation values.

Referring back to FIG. 3B, the encoder 320 performs discrete cosine transform (DCT) 352, for example, on each of the blocks. The DCT 352 transforms the values of the pixels in the blocks from the spatial domain to DCT coefficients in the frequency domain, as described above, and further described in detail in connection with at least FIGS. 4A, 4B, 5A, 5B, and 6.

Figure 4A:
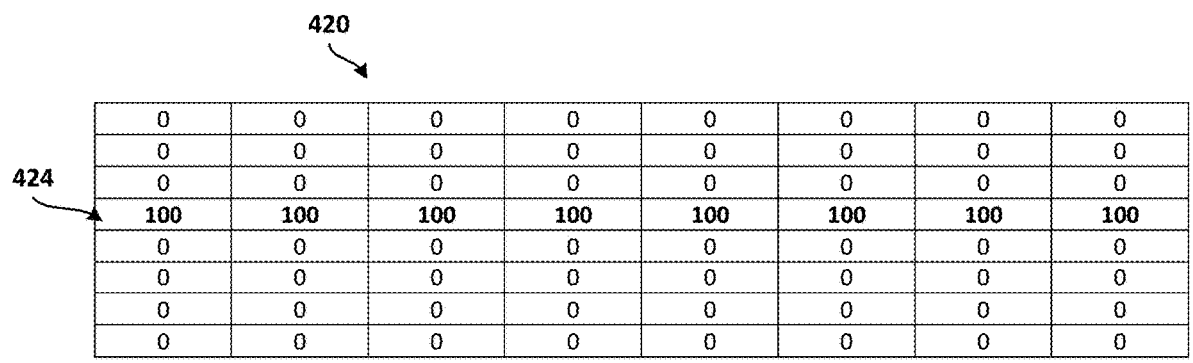
FIGS. 4A and 4B illustrate matrices representing blocks of texture features, according to example implementations.
Figure 4B:
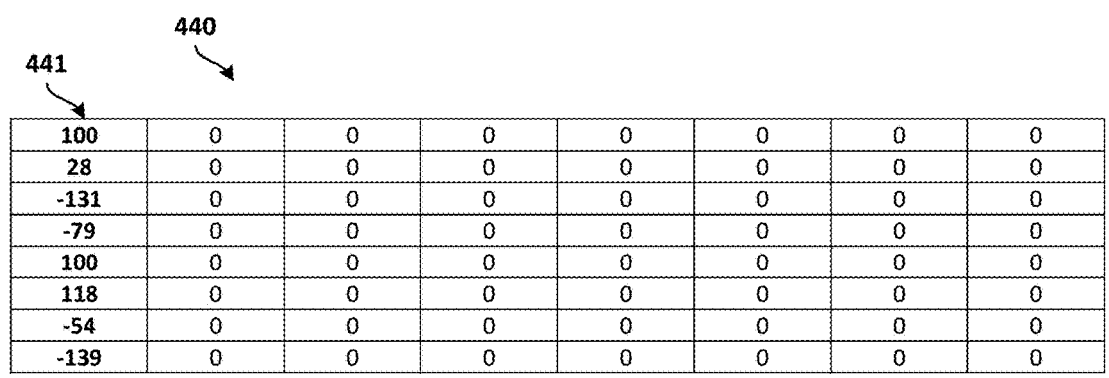

Referring to FIG. 4A, a matrix 420 represents texture features (e.g., texture feature 112 of FIG. 1A) that are aligned with the x-axis of the image (e.g., 100 of FIG. 1A or 200 of FIG. 1B). In FIG. 4A, the texture features 112 correspond to row 4 (424) of the matrix 420 and with pixel values of 100. A pixel value of 100 represents a full pixel (and a pixel value of 50 represents a half-filled pixel). The encoder 320 performs DCT 352 on the matrix 420 and generates a DCT matrix 440 which includes two-dimensional DCT coefficients of the texture features 112. For example, the DCT matrix 440 has non-zero values in the first column 441 and zero values in the other columns. The zero values, for example, in columns 2-8 of the DCT matrix 440, achieves higher compression ratios during the quantization 354 and entropy decoding 356, described below in detail.

However, FIG. 5A illustrates a matrix 520 that represents the texture features 116 that are not aligned with either x-axis or y-axis of the image (e.g., 100 of FIG. 1A or 200 of FIG. 2A). The pixel values of the texture features 116 are illustrated by pixel values highlighted in bold in the matrix 520. As illustrated by the values in bold, the pixels with non-zero values are spread over the matrix 520. The encoder 320 performs the DCT 352 on the matrix 520 and generates a matrix 540 of FIG. 5B which includes two-dimensional DCT coefficients of the texture features 116. As shown in the matrix 540 of FIG. 5B, the DCT matrix 540 contains mostly non-zero values (e.g., relative to the matrix 440 of FIG. 4B associated with the texture features 112 of FIG. 1A) and are spread all over the matrix 540 (for instance, not limited to just one row or a column). The non-zero values spread out over multiple rows/columns of the DCT matrix 540 results in lower compression ratios.

In some implementations, because of the rotation being performed prior to the compression on blocks associated with the texture features that are not co-aligned with either axes of the image 100 (e.g., texture features 116), the DCT matrix generated based on the geometric transformation 340 is shown by DCT matrix 640 of FIG. 6. As illustrated in FIG. 6, row 4 (624) of the DCT matrix 640 has non-zero values and all other rows have zero values. This achieves higher compression ratios (when compared to matrix 540 of FIG. 5B). Although, the rotation values have to be encoded and/or transmitted for the decoder to properly decode the compressed bit stream 357 and generate the image 312, the benefits (e.g., reduction in the number of bits) of higher compression ratios outweigh the burden associated with the extra number of bits needed for representing rotating values.

Referring back to FIG. 3B, the encoder 320 performs quantization 354 to quantize the DCT coefficients 353 and generate quantized DCT coefficients 355. The quantization process maps values within a relatively large range to values in a relatively small range and thus reducing the amount of data needed to represent the quantized DCT coefficients 355. During the quantization 354, many higher DCT coefficients are zeroed out for better compression ratios.

The encoder 320 further performs entropy encoding 356 to entropy encode the matrices. During entropy encoding, the values in the top left of the matrices are given relatively higher importance and the values in the right and/or bottom (to the DC coefficient) are given relatively lower importance and are encoded in a zig-zag pattern. This results in cells with zero values appearing at the end of the zig-zag pattern and therefore efficiently compressed. After encoding all the blocks that correspond to the image 310, the encoder 320 generates a compressed bit stream 357 (e.g., a compressed or encoded image).

The decoder 322, upon receiving the compressed bit stream 357 performs a decoding process to decompress the compressed bit stream 357 and generate image 312. The image 312 may be similar to the image 310, with very minimal or no loss in quality. The decompression process includes one or more of entropy decoding 372, dequantization 374, inverse discrete cosine transform (IDCT) 376, inverse geometric transformation 380, and inverse color space conversion 392. The decompression process generates the image 312.

In some implementations, for example, the decoder 322 performs entropy decoding 372 of the compressed bit stream 357 and generates quantized DCT coefficients 373. The decoder 322 further performs dequantization 374 of the quantized DCT coefficients 373 and generates DCT coefficients 375. For example, one DC coefficient and 63 AC coefficients may be generated for each block upon the dequantization 374. The decoder 322 further performs an inverse discrete cosine transform (IDCT) 376 on the quantized DCT coefficients 375 and generates geometrically transformed pixel values 377. The geometrically transformed pixel values 377 may be used for generating the image 312.

The image 312 generated from geometrically transformed pixel values 377 may include features that are rotated. Therefore, the decoder 322, in some implementations, for example, performs inverse geometric transformation 380 on the geometrically transformed pixel values 377 and generates pixel values 381. The decoder 322 use the rotation or geometric transformation values received from the encoder to perform the inverse geometric transformation 380 such that the texture features can be restored to their original position. For example, in some example implementation, upon performing the inverse geometric transformation 380, the texture features 216 will be restored to their original position 116. The decoder 322 performs inverse color space conversion 392 to convert the pixel values from the second color space (e.g., $YC_bC_r$) to the first color space (e.g., RGB) and outputs the pixel values in RGB color space 393 which the decoder uses to generate the image 312 for displaying (e.g., on a device, in a browser, in an application, etc.).

As described above, the compression of images that include texture features that are not aligned with either axis of the image being compressed may be improved by rotating/geometrically transforming such texture features to be aligned with one of the axes of the image being compressed. This achieves better compression ratios and/or can result in an improvement in user experience.

In some implementations, for example, the image 312 may be further refined during the decoding the process. For example, the decoder 322 may perform entropy decoding, dequantization, IDCT, inverse geometric transformation, full-image regularization, de-blocking, and detailing, geometric transformation, DCT, constraining regularized and de-blocked DCT coefficients with possible values ranges defined by dequantization, IDCT, inverse geometric transformation, and inverse color space conversion to generate the decompressed images to further improve the quality of the image 312.

Figure 7:
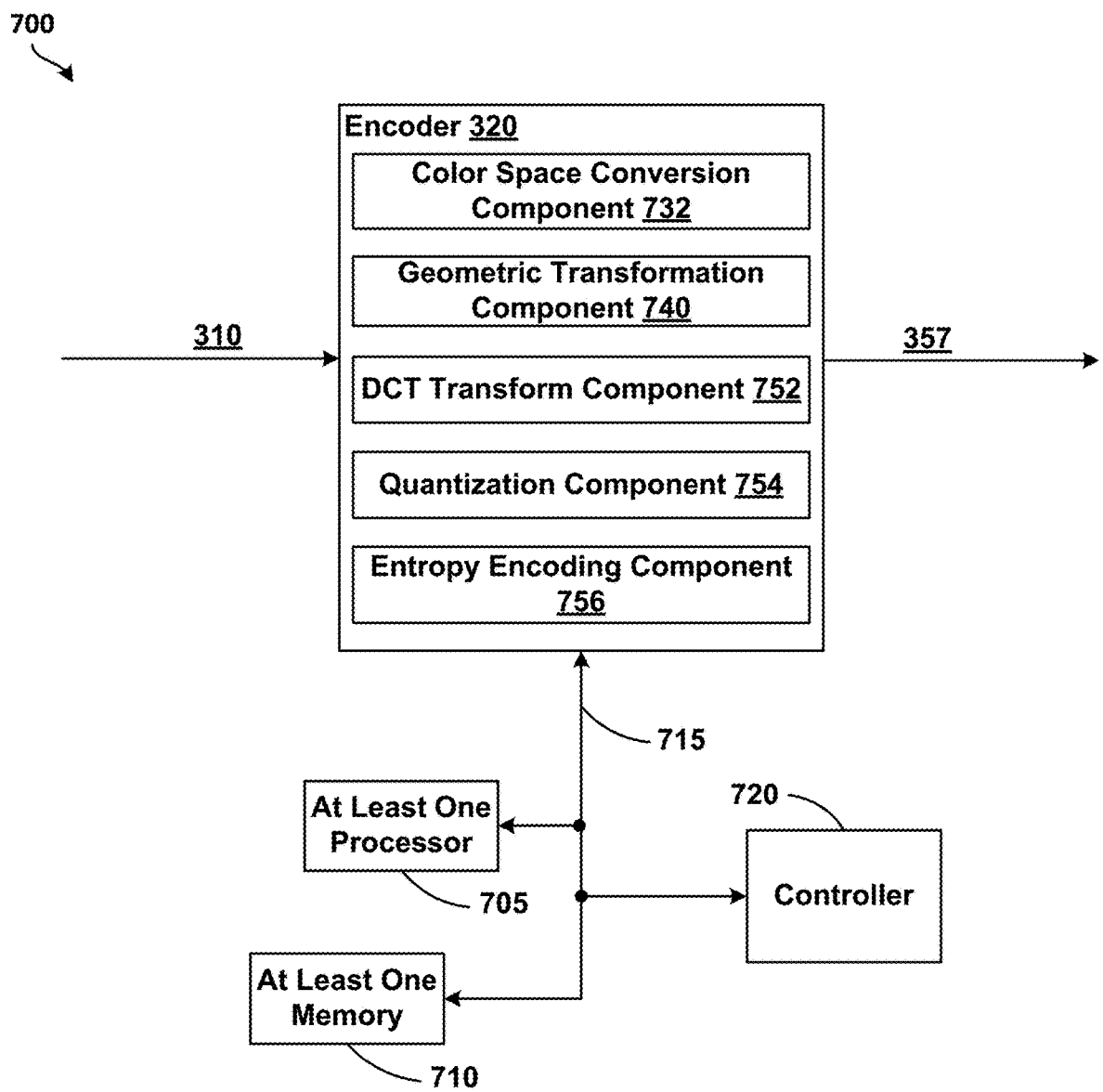
FIG. 7 illustrates an encoder system, according to at least one example implementation.

FIG. 7 illustrates a block diagram of an encoder system 700, according to at least one example implementation.

The encoder system 700 may be understood to include various standard components which may be utilized to implement the techniques described herein, or different or future versions thereof. As shown in FIG. 7, the encoder system 700 includes the at least one processor 705, the at least one memory 710 (e.g., a computer readable storage medium), a controller 720, and an encoder 320. The at least one processor 705, the at least one memory 710, the controller 720, and the encoder 320 are communicatively coupled via bus 715.

The at least one processor 705 may be configured to execute computer instructions associated with the controller 720 and/or the encoder 320. The at least one processor 605 may be a shared resource. For example, the encoder system 320 may be an element of a larger system.

The at least one memory 710 may be configured to store data and/or information associated with the encoder system 700. For example, the at least one memory 710 may be configured to store buffers including, for example, buffers storing geometric data, portions of the geometric data, positions of data points in the geometric data, a number of data points associated with a portion of the geometric data, geometric transformation values, and/or the like. For example, the at least one memory 710 may be configured to store models, training algorithms, parameters, data stores, and the like.

The controller 720 may be configured to generate various control signals and communicate the control signals to various blocks in encoder system 700. The controller 720 may be configured to generate the control signals in accordance with the method described below. The controller 720 may be configured to control the encoder 320 to encode geometric data using a model according to example implementations as described herein. For example, the controller 720 may generate and communicate a control signal(s) indicating a model and/or parameter associated with the model.

Figure 8:
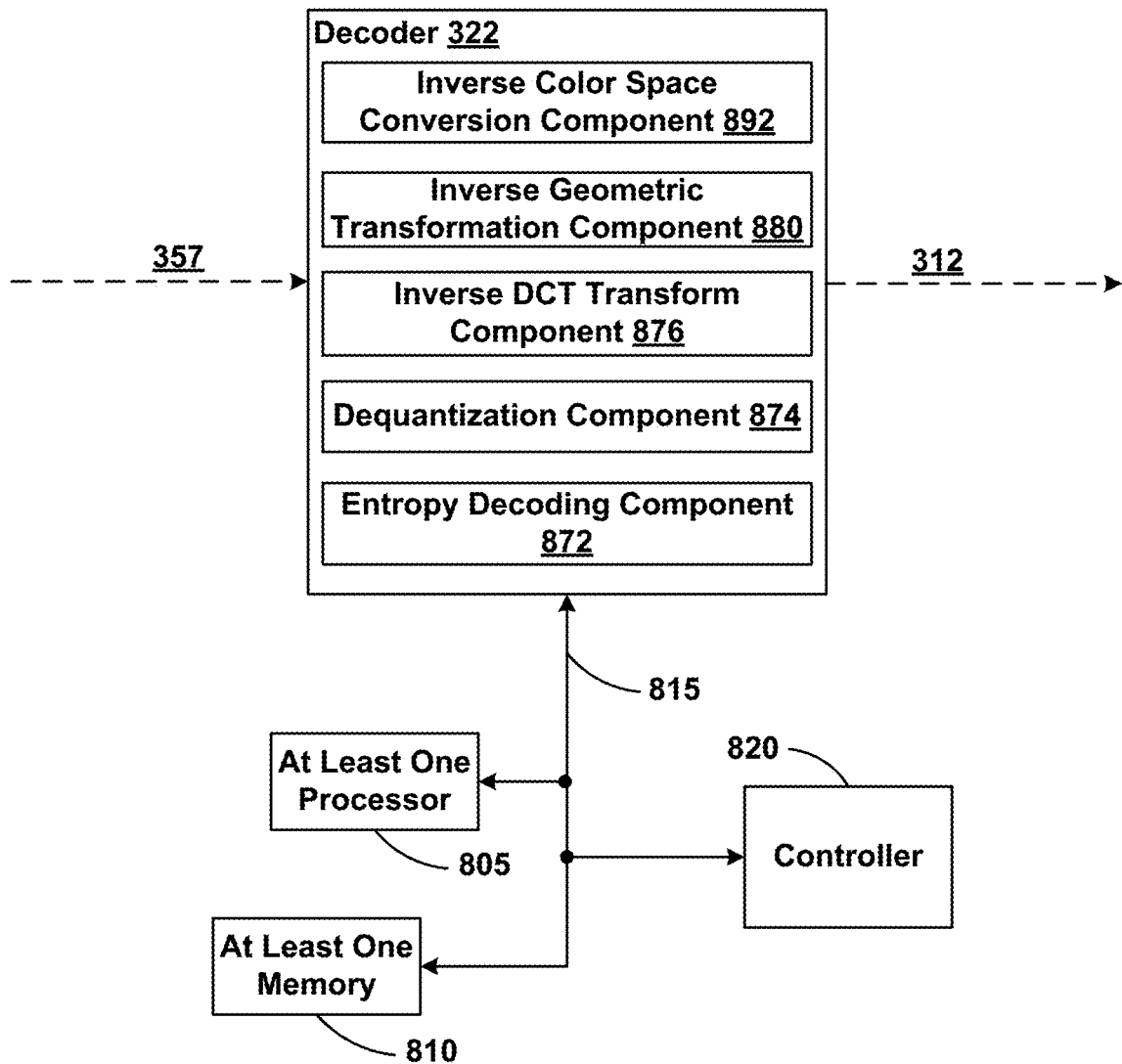
FIG. 8 illustrates a decoder system, according to at least one example implementation.

FIG. 8 illustrates a block diagram of a decoder system 800, according to at least one example implementation.

In the example of FIG. 8, a decoder system 800 may be at least one computing device and should be understood to represent virtually any computing device configured to perform the methods described herein. As such, the decoder system 800 may be understood to include various standard components which may be utilized to implement the techniques described herein, or different or future versions thereof. By way of example, the decoder system 800 is illustrated as including at least one processor 805, as well as at least one memory 810 (e.g., a computer readable storage medium), a controller 820, and a decoder 322. The at least one processor 805, the at least one memory 810, the controller 820, and the decoder 825 are communicatively coupled via bus 815.

The at least one processor 805 may be configured to execute computer instructions associated with the controller 820 and/or the decoder 370. The at least one processor 805 may be a shared resource. For example, the decoder system 800 may be an element of a larger system (e.g., a mobile device). Therefore, the at least one processor 805 may be configured to execute computer instructions associated with other elements (e.g., web browsing or wireless communication) within the larger system.

The at least one memory 810 may be configured to store data and/or information associated with the decoder system 800. For example, the at least one memory 810 may be configured to store a model and parameters associated with the geometric data, and/or the like.

The controller 820 may be configured to generate various control signals and communicate the control signals to various blocks in decoder system 800. The controller 820 may be configured to generate the control signals in accordance with the methods described below. The controller 820 may be configured to control the decoder 370 to decode compressed data associated with geometric data using a model and parameters according to example implementations as described above.

Figure 9:
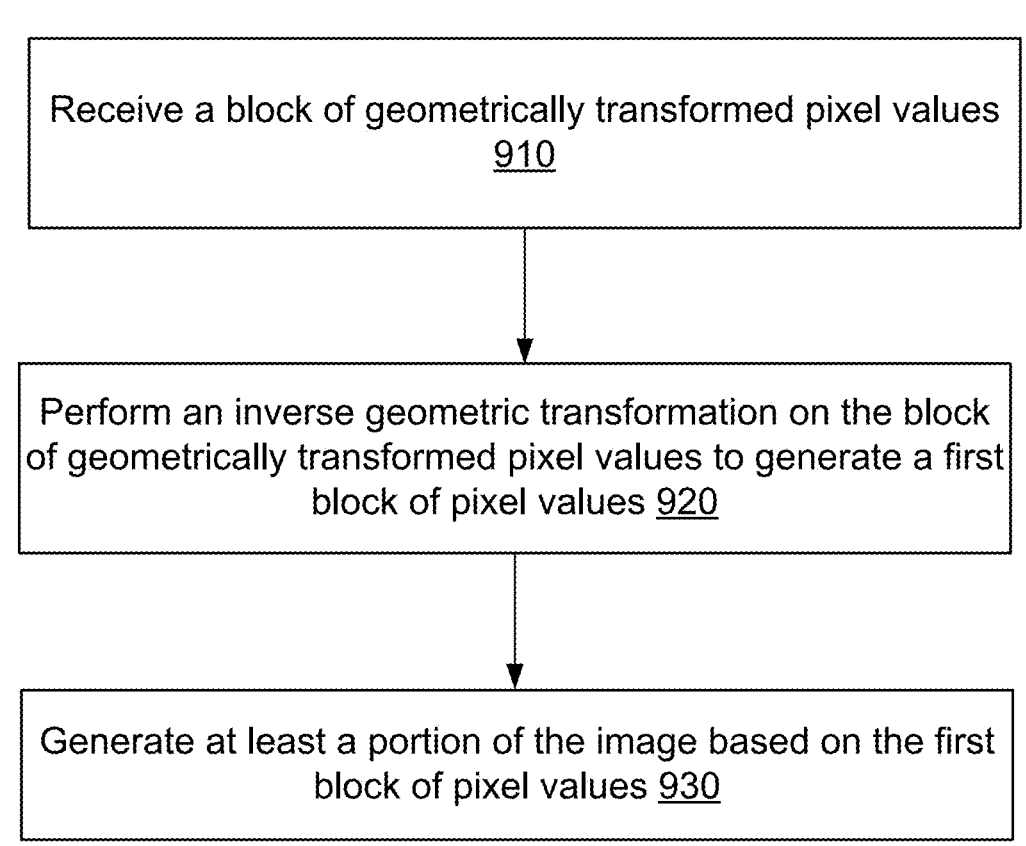
FIG. 9 illustrates a flowchart of a method of decompressing, according to at least one example implementation.

The method steps described with regard to FIG. 9 may be executed as software code stored in a memory (e.g., at least one memory 710, 810) associated with an encoder and/or decoder system (e.g., as shown in FIGS. 2-8) and executed by at least one processor (e.g., processor 705, 705) associated with the encoder and/or decoder system. For example, the memory can be a non-transitory computer-readable storage medium having storing computer executable program code which, when executed on a computer system, causes the computer system to perform steps described below with regard to FIG. 9. However, alternative implementations are contemplated such as an encoder or a decoder embodied as a special purpose processor.

For example, the method steps may be performed by an application-specific integrated circuit, or ASIC. For example, the ASIC may be configured as the encoder 320, the decoder 370, and/or the controller 720/820. Although the steps described below are described as being executed by a processor, the steps are not necessarily executed by a same processor. In other words, at least one processor may execute the steps described below with regard to FIG. 9.

FIG. 9 illustrates a flowchart 900 of a method of decompressing or decoding an image, according to at least one example implementation. In some implementations, for example, the method may be performed by decoder of FIGS. 3A, 3B, and 8.

At block 910, a decoder may receive a block of geometrically transformed pixel values. In some implementations, the decoder 322 may receive a block of geometrically transformed pixel values (e.g., 377 of FIG. 3B).

At block 920, a decoder may perform inverse geometric transformation on a block of geometrically transformed pixel values to generate a block of pixel values. For example, in some implementations, the decoder 322 and/or the inverse geometric transform component 880 may perform inverse geometric transformation 380 on a block of geometrically transformed pixel values 377 to generate a block of pixel values 381. The block of pixel values 381 represent texture features (e.g., texture feature 116) of the image 200 that are not co-aligned with either x-axis or y-axis of the image 200. The decoder 322 and/or the inverse geometric transformation component 880 perform the inverse geometric transformation on a block basis and the block being one of the blocks of the image 200.

At block 930, the decoder may generate at least a portion of the image based on the first block of pixel values. For example, in some implementations, the decoder 322 may generate at least a portion of the image 312 based on the first block of pixel values 381.

Thus, the decompression of an image that includes texture features that are not co-aligned with either axes of the image can be performed such that the achieved compression ratios of the image is better by rotating or geometrically transforming the texture features to be co-aligned with one of the axes of the image. This mechanism will make the transmission of images faster and improve the end user experience during the decompression process.

Figure 10:
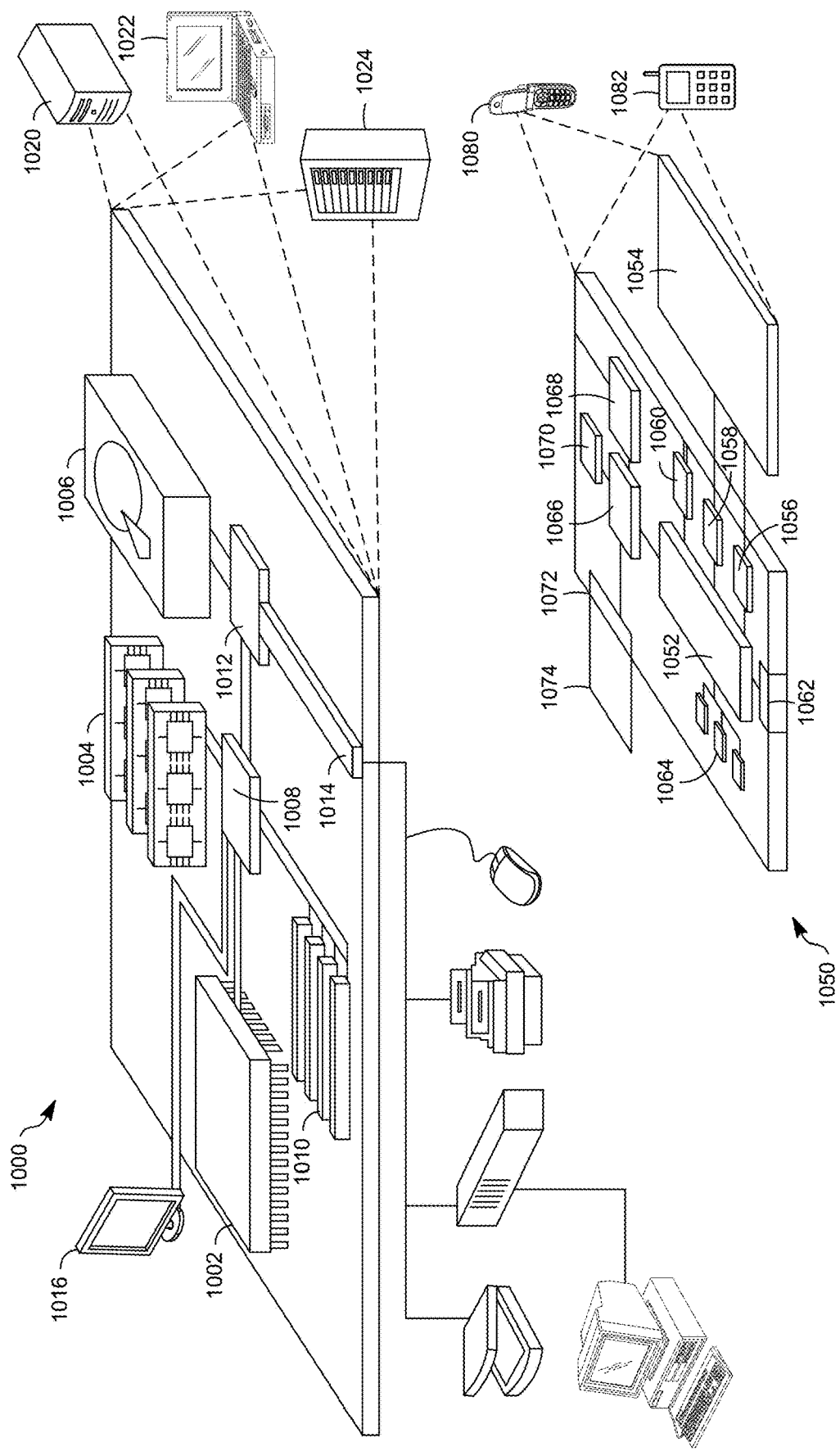
FIG. 10 illustrates an example of a computer device and a mobile computer device, which may be used with the techniques described here.

FIG. 10 shows an example of a computer device 1000 and a mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In some implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 may also be another form of computer-readable medium, such as a magnetic or optical disk.

The storage device 1006 is capable of providing mass storage for the computing device 1000. In some implementations, the storage device 1006 may be or contain a computer-readable medium, such as a floppy disk device, a hard disk device, an optical disk device, or a tape device, a flash memory or other similar solid-state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is exemplary only. In some implementations, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1052, 1054, 1064, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, to enable near area communication of device 1050 with other devices. External interface 1062 may provide, for example, for wired communication in some implementations, or for wireless communication in some implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also.

Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In some implementations, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation In some or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations s only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

What is claimed is:

1. A computer-implemented method, comprising:
   receiving, by a decoder, a compressed bit stream including geometric transformation values;
   performing entropy decoding on the compressed bit stream to define quantized discrete cosine transform (DCT) coefficients;
   performing dequantization of the quantized DCT coefficients to define DCT coefficients;
   performing inverse discrete cosine transform on the DCT coefficients to generate a block of geometrically transformed pixel values;
   performing, by the decoder, an inverse affine transformation on the block of geometrically transformed pixel values to generate a block of pixel values of an image such that a texture feature is restored to an original position in the block of pixel values of the image based on the geometric transformation values,
   the block of geometrically transformed pixel values representing the texture feature of a block of the image that is geometrically rotated from being non-parallel to being parallel with a vertical axis or a horizontal axis of the image by applying an affine transformation; and
   generating, by the decoder, at least a portion of the image based on the block of pixel values.

2. The computer-implemented method of claim 1, wherein the geometric transformation values are stored on a basis of a tile.

3. The computer-implemented method of claim 2, wherein a size of the tile is 64×64 pixels.

4. The computer-implemented method of claim 1, wherein the block of pixel values is a first block of pixel values, the computer-implemented method further comprising:
   performing, by the decoder, an inverse color space conversion on the first the block of pixel values to convert the first block of pixel values in a first color space to a second block of pixel values in a second color space.

5. The computer-implemented method of claim 4, wherein the first color space is a $YC_bC_r$ color space and the second color space is an RGB color space.

6. A non-transitory computer-readable storage medium having stored thereon computer executable program code which, when executed on a computer system, causes the computer system to perform operations, comprising:
   receiving a compressed bit stream including geometric transformation values;
   performing entropy decoding on the compressed bit stream to define quantized discrete cosine transform (DCT) coefficients;
   performing dequantization of the quantized DCT coefficients to define DCT coefficients;

performing inverse discrete cosine transform on the DCT coefficients to generate a block of geometrically transformed pixel values;

performing an inverse affine transformation on the block of geometrically transformed pixel values to generate a first block of pixel values of an image such that a texture feature is restored to an original position in the first block of pixel values of the image based on the geometric transformation values, the block of geometrically transformed pixel values representing the texture feature of a block of the image that is geometrically rotated from being misaligned to being aligned with a horizontal axis or a vertical axis of the image by applying an affine transformation;

performing an inverse color space conversion on the first block of pixel values to convert the first block of pixel values that are in a first color space to a second block of pixel values in a second color space; and generating at least a portion of the image based on the second block of pixel values in the second color space.

7. The non-transitory computer-readable storage medium of claim 6, the operations further comprising:

receiving, by a decoder, a compressed bit stream of the image; and performing, by the decoder, entropy decoding on the compressed bit stream of the image to generate a block of quantized DCT coefficients.

8. The non-transitory computer-readable storage medium of claim 6, wherein the geometric transformation values are stored on a basis of a tile.

9. The non-transitory computer-readable storage medium of claim 8, wherein a size of the tile is 64×64 pixels.

10. The non-transitory computer-readable storage medium of claim 6, wherein the first color space is a $YC_bC_r$ color space and the second color space is an RGB color space.

11. A method, comprising:

receiving a compressed bit stream including geometric transformation values;

performing entropy decoding on the compressed bit stream to define quantized discrete cosine transform (DCT) coefficients;

performing dequantization of the quantized DCT coefficients to define DCT coefficients;

performing inverse discrete cosine transform on the DCT coefficients to generate a block of geometrically transformed pixel values;

performing an inverse affine transformation on the block of geometrically transformed pixel values to generate a block of pixel values of an image such that a texture feature is restored to an original position in the block of pixel values of the image based on geometric transformation values, the block of geometrically transformed pixel values representing the texture feature of a block of an image that is geometrically rotated from being diagonally aligned, when at the original position within the image, to being vertically or horizontally aligned by applying an affine transformation; and performing inverse color space conversion on the block of pixel values to convert the block of pixel values from a first color space to a second color space.

12. The method of claim 11, further comprising:

receiving, by a decoder, a compressed bit stream of the image; and performing, by the decoder, entropy decoding on the compressed bit stream of the image to generate a block of quantized DCT coefficients.

13. The method of claim 11, wherein the geometric transformation values are stored on a basis of a tile.

14. The method of claim 13, wherein a size of the tile is 64×64 pixels.

15. The computer-implemented method of claim 1, wherein the horizontal axis includes an x-axis of the image.

16. The computer-implemented method of claim 1, wherein the vertical axis includes a y-axis of the image.

* * * * *